United States Patent [19]

DeBruyne

[11] Patent Number: 4,852,437
[45] Date of Patent: Aug. 1, 1989

[54] METHOD AND APPARATUS FOR LOCATING AND CLAMPING A WORKPIECE, SUCH AS A PISTON, PRIOR TO ROTATING SAME IN A MACHINING OPERATION

[75] Inventor: Robert W. DeBruyne, Warren, Mich.

[73] Assignee: The Cross Company, Fraser, Mich.

[21] Appl. No.: 213,192

[22] Filed: Jun. 29, 1988

[51] Int. Cl.[4] .................. B23B 5/24; B23B 23/04; B23B 33/00

[52] U.S. Cl. .................. 82/165; 269/52; 279/1 L; 279/1 DA; 279/1 S

[58] Field of Search .......... 82/33 R, 33 A, 40 R, 82/43, 45, DIG. 6; 269/52; 279/1 L, 1 DA, 1 DC, 1 S

[56] References Cited

U.S. PATENT DOCUMENTS

| | | | |
|---|---|---|---|
| 1,947,957 | 7/1934 | Tillman | 82/40 R |
| 2,402,979 | 7/1946 | Barto | 82/33 R |
| 2,732,213 | 1/1956 | Drew | 279/1 S |
| 2,851,831 | 9/1958 | Healy | 279/1 DC |
| 3,212,374 | 10/1965 | Anthony | 82/44 |
| 3,266,349 | 8/1966 | Lane | 82/40 R |
| 3,311,006 | 3/1967 | Seitter | 82/40 R |
| 3,460,239 | 8/1969 | Nix | 29/559 |
| 3,484,809 | 12/1969 | Swenson | 82/40 R |
| 3,497,202 | 2/1970 | Bonin | 269/47 |
| 3,795,405 | 3/1974 | Lecailtel et al. | 279/1 L |
| 3,901,519 | 8/1975 | Lecailtel et al. | 279/1 L |
| 4,604,923 | 8/1986 | Link et al. | 82/45 |

Primary Examiner—Frederick R. Schmidt
Assistant Examiner—William E. Terrell
Attorney, Agent, or Firm—David R. Syrowik; Raymond J. Eifler

[57] ABSTRACT

A method and apparatus for locating and clamping a piston (10, 110) between headstock and tailstock assemblies (18, 118 and 20, 120) before rotating same about a rotary axis (22, 122) in a machining operation is characterized by an equalizing mechanism or member (50, 150) for equalizing the axial force between a pair of equalizing pins (48, 148) of a first set of axially extending locating pins (46, 48; 146, 148) to thereby create a locating plane on a first surface of the workpiece. The first set of axially extending pins coacts with a second set of axially extending equalizing pins (30, 130) to clamp the workpiece therebetween. The first set of locating pins are located in a housing member (38, 138). The first set of pins also includes two fixed locating pins (48, 148) which contact the outer surface of the piston. The second set of axially extending pins includes four equalizing driving pins (30, 130) which contact the inner surface of the piston directly opposite the four locating pins of the first set at non-colinear points radially spaced about the rotary axis. Preferably, a centering member (52) also housed in the housing member is provided for centering the piston about the rotary axis.

15 Claims, 5 Drawing Sheets

METHOD AND APPARATUS FOR LOCATING AND CLAMPING A WORKPIECE, SUCH AS A PISTON, PRIOR TO ROTATING SAME IN A MACHINING OPERATION

This invention relates to method and apparatus for locating and clamping a workpiece, such as a piston, prior to rotating the piston in a turning machine that will remove metal from the piston.

Workpiece rotation by means of a headstock-mounted chuck or collar provides a rigid setup and minimizes chatter during machining. More precise results, however, can often be obtained by supporting the workpiece between two centers. The compensating chuck is either a solid or spring-loaded center and can be used to rotate workpieces between centers.

Hollow and tubular workpieces are often mounted on mandrels for internal gripping. Three types of mandrels are utilized for internal gripping, they are: pin type, expanding type and threaded type. Pin type mandrels are used for gripping cast, forged or rough bores. Three or six pins or shoes move outward to centralize and grip the parts. These pins are usually power-operated through a drawbar that is attached to the mandrel to push the pins by cam action through openings in the body of the mandrel.

When the design of the workpiece permits, exerting driving power on one face of workpiece can increase productivity. Face drivers permit machining the entire outer diameter of a part in one clamping as well as turning at high speeds. A high degree of accuracy is maintained because the position of the workpiece does not have to be changed.

One type of face driver consists of a driving head and a locating shank that fits on the spindle nose of a lathe. The driving head contains a spring-loaded center, drive pins and a compensating device that permits each drive pin to adjust to irregularities on the face of the workpiece.

As the lathe tailstock applies axial force to the workpiece, the center of the driver retracts slightly against its spring pressure to allow the chisel-edged drive pins to bite into the end face of the workpiece. During cutting, torque is increased and the pins bite deeper into the face for positive clamping. Some workpiece faces have holes as the driving pins enter the holes.

The prior art includes a clamping device for holding a piston for machining. The piston part is secured by applying opposing thrusts to opposite sides of the piston dome using a four point pivotable plate. U.S. Pat. No. 3,795,405 entitled "CLAMPING OF PARTS BY ADHERENCE ON AXIAL THRUST SUPPORT" and issued Mar. 5, 1974, is an example of such prior art.

However, the prior art is not capable of holding a piston for machining at high speeds and tolerances without introducing distortions due to clamping.

SUMMARY OF THE INVENTION

The method of the present invention is characterized by the step of equalizing the axial force between two contact points of a first set of contact points to create a locating plane on a first surface of a workpiece.

The apparatus of the present invention is characterized by equalizing means for performing the above-noted method step.

The advantage of the present invention is to provide a method and apparatus for locating and clamping a workpiece such as a piston, which has the ability to conform to dimensional variations between each "identical" type of workpiece and to hold the workpiece secure to allow machining without introducing distortions due to the clamping.

Other advantages accruing to the use of the method and apparatus of the invention are numerous. For example, the method and apparatus are capable of locating and clamping a workpiece, such as a piston, during a machining operation while holding extremely high tolerances in a reliable and cost-efficient fashion. Such method and apparatus are particularly useful in the mass production of such pistons for automobile engines.

Such method and apparatus are particularly useful in a turning machine so that during rotation of the workpiece the outer surface does not deviate to any substantial extent (i.e. on the order of 0.0001 inches depending on piston stiffness) from its non-rotating state. As a result, dimensional accuracy is held to an extremely close tolerance at speeds above 1,800 rpm. The above advantages and other advantages and features of the present invention are readily apparent from the following detailed description of the invention when taken in connection with the accompanying drawings.

DETAIL DESCRIPTION OF THE INVENTION

Figure 1:
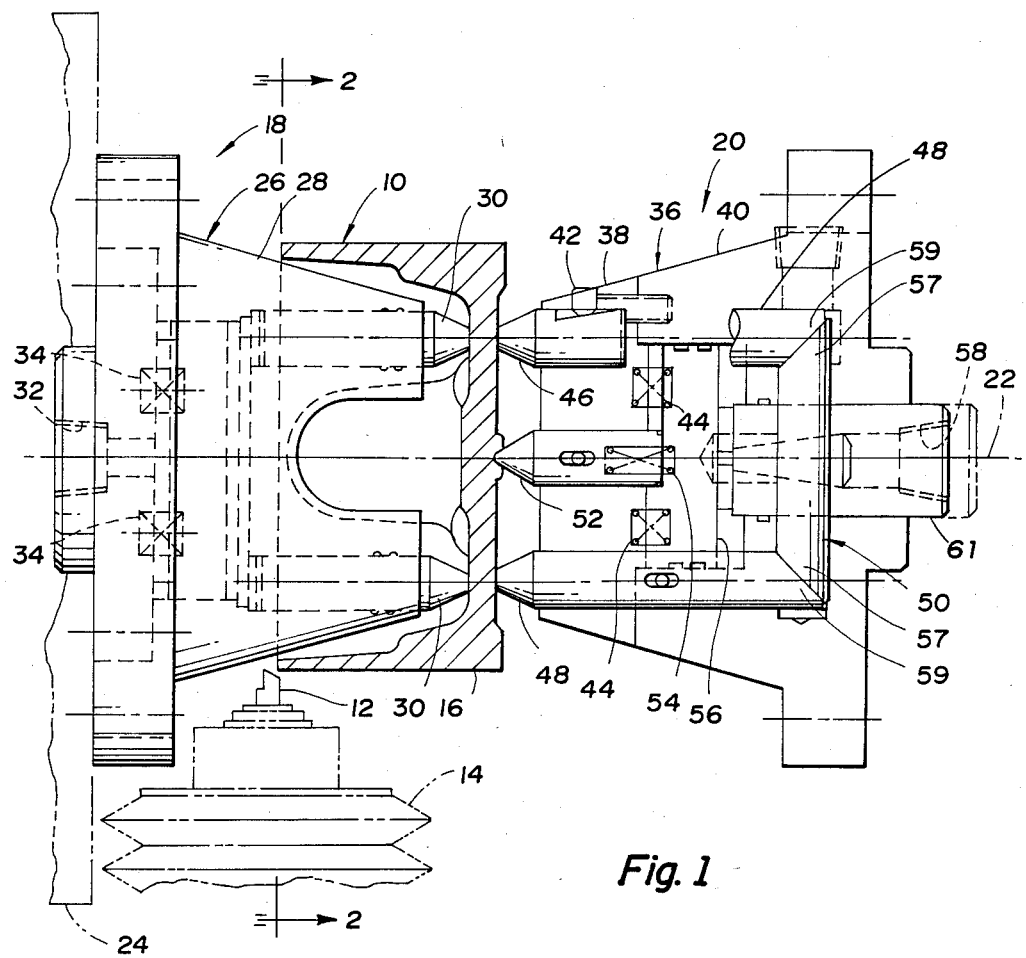
FIG. 1 is a view, partially broken away, illustrating portions of headstock and tailstock assemblies for turning a piston and illustrating the method and system of the present invention.
Figure 2:
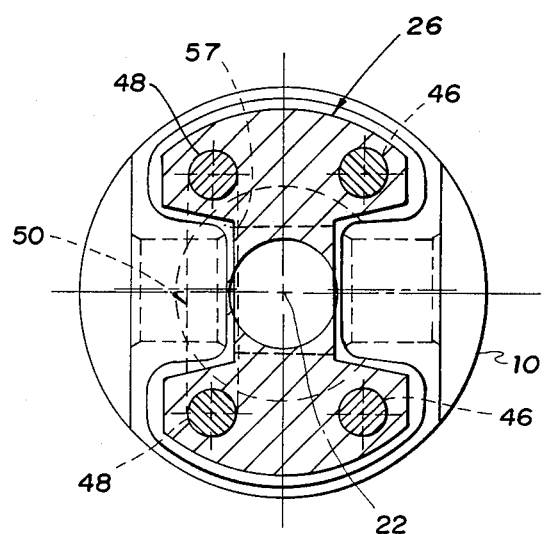
FIG. 2 is an end view of the tailstock assembly of FIG. 1.

Referring now to FIG. 1, there is illustrated in cross-section a workpiece, such as a piston, generally indicated at 10, held between a headstock assembly and a tailstock assembly, generally indicated at 18 and 20, respectively. In particular, the piston 10 is for an automotive vehicle and may be a precision die cast piston with finished cast dome having center bosses. The piston, alternatively, may have a finished dome with a center boss and semi-finished skirts.

The piston 10 is shown as being turned by a cutting tool 12 which is held within a tool holder 14 of a turning machine, for example, the turning machine described in U.S. Pat. No. 4,653,360 (having the same assignee as the present application and which is hereby expressly incorporated by reference). As described in U.S. Pat. No. 4,653,360, a complex (i.e. elliptical) surface 16 of the piston 10 is turned by the cutting tool 12. The piston surface 16 may be considered as having a generally frusto-conically tapered shape wherein the actual cross section of the surface is elliptical.

The headstock assembly 18 and the tailstock assembly 20 co-axially chuck and rotate the piston 10 about a rotary axis 22. Preferably, the angular velocity of the piston 10 is relatively constant and is greater than 1200 rpm.

The headstock assembly 18 includes an adaptor 24 for mounting an inner diameter chuck assembly, generally indicated at 26, to the headstock assembly 18. The inner diameter chuck assembly includes a housing 28 within which four axially extending equalizing members or pins 30 are biased by springs 34 and are movably mounted. The pins are equalized under control of pressurized oil introduced into a port 32 extending through the adaptor 24 and into the housing 28. The oil is in fluid communication with the ends of the pins 30 opposite the piston engaging ends of the pins 30.

The tailstock assembly 20 includes an outer diameter chuck assembly, generally indicated at 36. The assembly 36 includes a housing member 38 which is secured to a cap member 40 by bolts or screws 42. The housing member 38 and the cap 40 together define a housing means or mechanism.

Stationary, axially extending locating members or pins 46 are mounted within the housing 38 for movement therewith. Two axially extending equalizing locating pins 48 are biased by an equalizing member, generally indicated at 50, toward the piston 10. The equalizing member 50 includes inclined portions 57 which slidably engages corresponding inclined portions 59 of the pin 48. The equalizing member 50 equalizes the pressure between the pins 48 by floating radially therebetween.

The outer diameter chuck assembly 36 also includes a centering member or pin 52 which is resiliently biased by a spring 54 which extends between the centering member 52 and a plunger 56 of the outer diameter chuck assembly 36.

The plunger 56 may be urged towards the housing member 38 either mechanically or under fluid pressure, such as by liquid or a gas. Springs 44 resiliently bias the plunger 56 away from the housing member 38. The surface of the plunger 56 opposite its spring engaging surface is in fluid communication with a port 58 which extends through a wedge member 61. Removal of the fluid pressure causes the wedge member 61 to move to its rightmost (i.e. phantom line) position in FIG. 1. In this position, the wedge member 61 engages the equalizing member 50 to prevent further vertical floating movement of the equalizing member 50.

Figure 3:
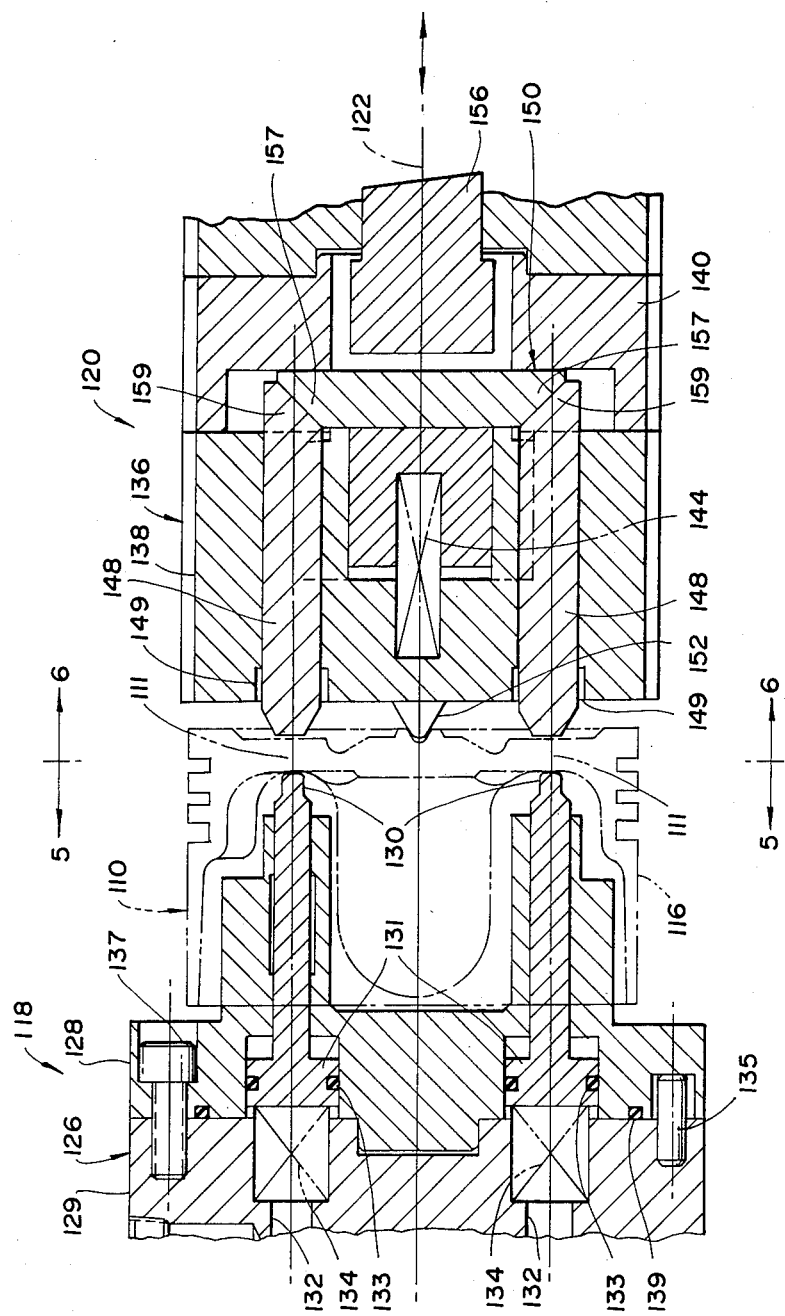
FIG. 3 is a sectional view, partially broken away and in cross-section, of a second embodiment of the apparatus of the present invention and taken along lines 3—3 of FIG. 6.
Figure 6:
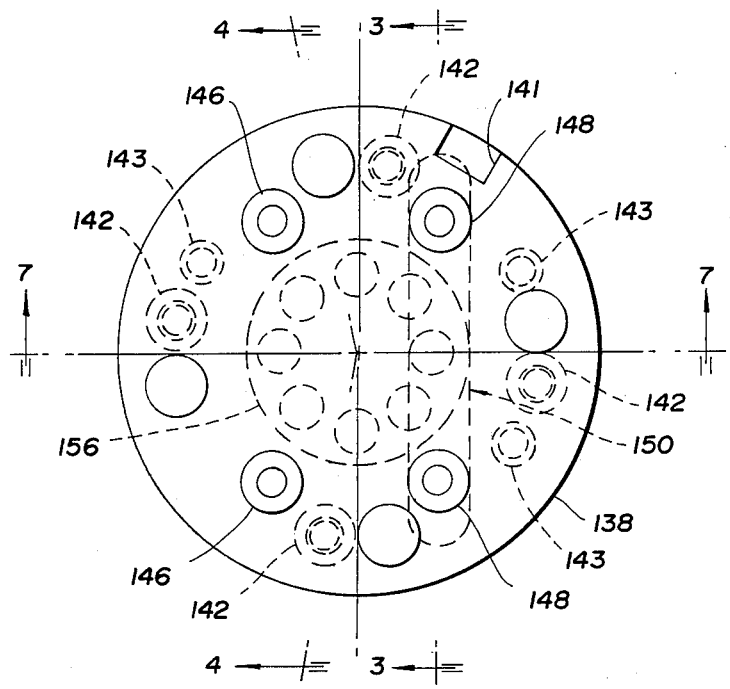
FIG. 6 is an end view of the tailstock assembly, taken along the line 6—6 of FIG. 3.

Referring now to FIG. 3, there is illustrated a second embodiment for carrying out the method and apparatus of the present invention. A grooved piston 110 is engaged and squeezed at bosses 111 of the piston 110 between four equalizing pins 130 of a headstock assembly, generally indicated at 118, and two equalizing pins 148 and two fixed pins 146, as illustrated in FIG. 6 of a drive stock assembly, generally indicated at 120. Preferably, each of the pins 130, 148 and 146 has a chiseledged tip for precisely locating the piston 110 therebetween for subsequent turning by a turning machine about an outer surface 116 of the piston 110. Also, preferably, the piston 110 is held by a force of approximately 5000 psi. at the pins 130, 146 and 148.

The headstock assembly 118 includes an inner diameter chuck, generally indicated at 126. The chuck 126 includes a housing 128 which houses the pins 130 for movement between extended and retracted positions under control of a pressurized fluid, such as oil at communicating ports 132. The pressurized fluid is in fluid communication with a piston portion 131 of each of the pins 130 and coact with springs 134 to cause the pins 130 to move between extended and retracted positions. The springs 134 extend between a plate 129 of the chuck assembly 126 and the piston portions 131 of the pins 130 to bias the pins 130 towards the piston 110. An O-ring 133 is provided about the outer circumferential surface of each of the piston portions 131 to seal the piston portions.

Dowels, such as the dowel 135, as well as screws 137 are provided for interconnecting the plate 129 and the housing 128. An O-ring 139 is provided for sealing the plate 129 and the housing 128.

Figure 4:
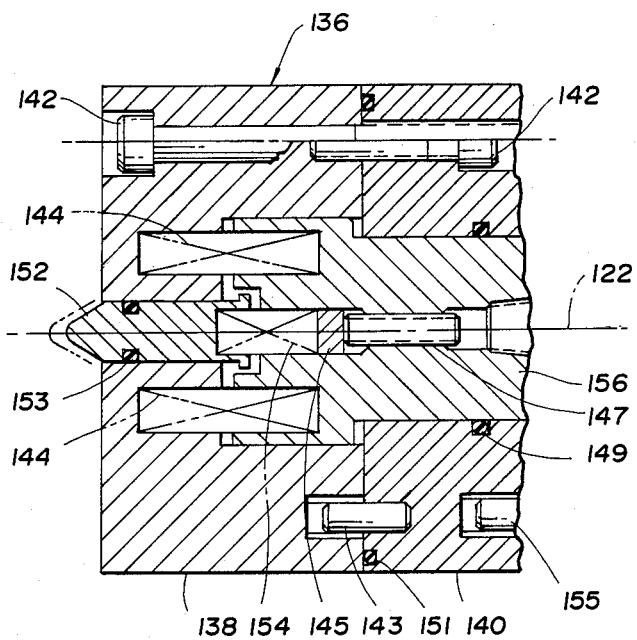
FIG. 4 is a sectional view of the tailstock assembly, taken along lines 4—4 of FIG. 6.

Referring now to FIG. 3 in combination with FIG. 4, the tailstock assembly 120 includes an outer diameter chuck, generally indicated at 136. The chuck 136 includes a housing 138 for housing the stationary locating pins 146 in fixed relationship and a cap member 140 for housing equalizing locating pins 148 for movement relative thereto. The housing 138 is secured to the cap member 140 by screws 142 and dowel pins 143.

A plurality of circumferentially spaced springs 144 extend between the housing 138 and a plunger 156 to bias the plunger 156 away from the piston 110. The equalizing pins 148 are biased toward the piston 110 in a clamping position by an equalizing member, generally indicated at 150, at the ends of the pins 148 opposite the piston 110. In particular, inclined end portions 157 of the equalizing member 150 slidably engage corresponding inclined portions 159 of the pins 148. Each of the equalizing pins 148 is slidably supported within the housing 138 by a silicon sealer 149 at the free end face of the housing 138.

The outer diameter chuck 136 further includes a centering member 152 which is biased toward the piston 110 by a spring 154 which extends between the centering member 152 and a washer 145 housed within the plunger 156. The centering member 152 is sealed within the housing 13 by an O-ring 153. The position of the washer 145 within the plunger 156 can be varied by an adjustable screw member 147 which is internally threaded within the plunger 156. In this way, the biasing force on the centering member 152 may be varied.

The plunger 156 is slidably movable within the cap member 140 and the housing 138 and is sealed therein by O-rings 149 and 151. The plunger 156 may be moved either manually or automatically. Automatic movement may be provided either mechanically or under fluid pressure, such as air or hydraulic fluid pressure.

Dowel pins 155 can be utilized to secure the outer diameter chuck 136 to an adaptor of the tailstock assembly 120.

Figure 5:
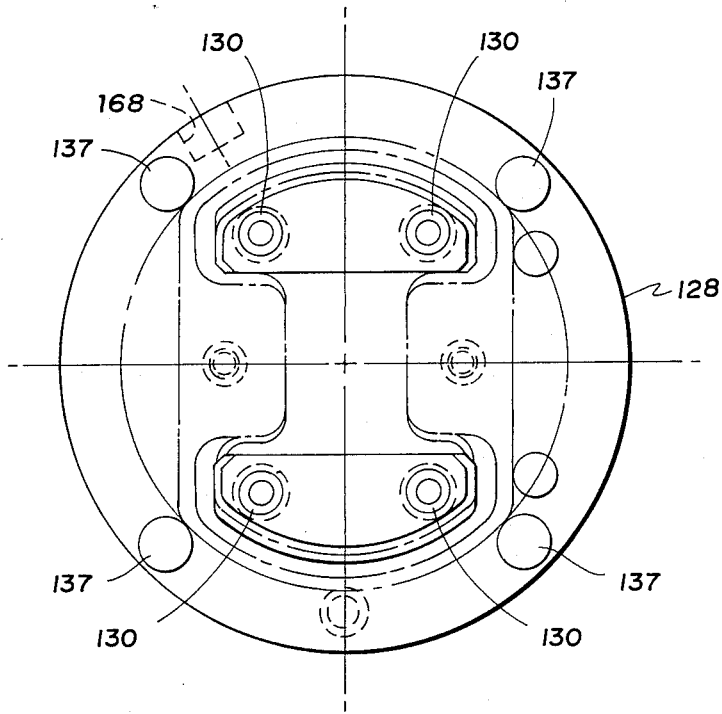
FIG. 5 is an end view of the headstock assembly, taken along 5—5 of FIG. 3.

Referring now to FIG. 5, there is illustrated an end view of the headstock assembly 118, taken along lines 5—5 of FIG. 3. The housing 128 includes an adjustment slot 168 for centering the inner diameter chuck 126 on the headstock assembly 118.

In like fashion, as illustrated in FIG. 6, the housing 138 of the outer diameter chuck 136 also includes an alignment slot 141 for aligning the outer diameter chuck 136 with the tailstock assembly 120.

Figure 7:
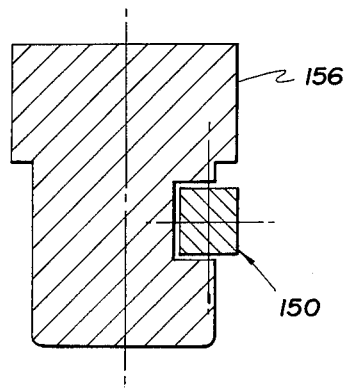
FIG. 7 is a sectional view of the tailstock assembly, taken along the lines 7—7 in FIG. 6.

Referring now to FIG. 7, there is illustrated the relative position of an equalizing member 150 with respect to the plunger 156 in the equalizing member's maximum unclamped position.

Figure 8:
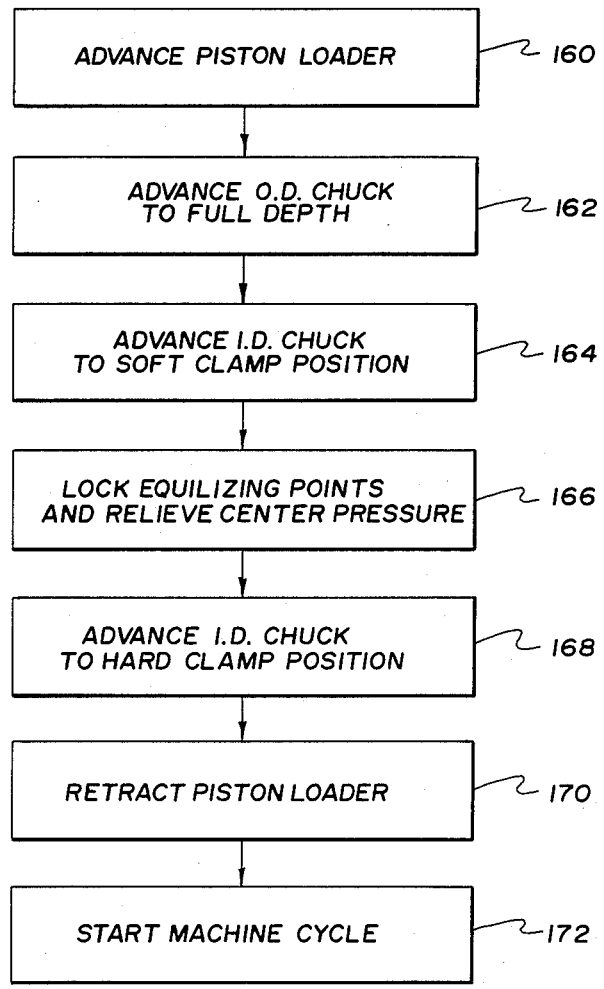
FIG. 8 is a block diagram in flowchart form illustrating the operation and synchronization of the headstock and tailstock assemblies which further illustrate the method and apparatus of the present invention.

Referring now to FIG. 8, there is illustrated in flowchart, block diagram form the various steps for locating and clamping the piston 10 or 110 with reference to the two embodiments of the apparatus of FIGS. 1 through 7.

At block 160, a piston loader (not shown) is advanced to position the piston 10 between the headstock assembly 18 or 118 and the tailstock assembly 20 or 120 with respect to FIG. 1.

At block 162, the outer diameter chuck assembly 36 or 136 is advanced to its full depth position.

At block 164, the inner diameter chuck assembly 26 or 126 is advanced to a soft clamped position. The pressure exerted by the equalizing locating pins 48 or 148 is equalized by the equalizing member 50 or 150, respectively to, in effect, provide three non-colinear points at the outer surface of the piston 10 or 110 which define a locating plane.

At block 166, the pressure is relieved on the pin 52 or 152 of the outer diameter chuck assembly 36 or 136, respectively, by allowing the wedge member 61 and the plunger 56 or 156 to move to the right as illustrated in FIGS. 1 and 3, respectively. The wedge member 61 and the plunger 156 engage the equalizing members 50 and 150, respectively, to lock their respective locating pins 48 and 148.

At block 168, the inner diameter chuck assembly 26 or 126 is then advanced to its hard-clamped position.

At block 170, the piston loader is retracted.

At block 172, the machine cycle is begun in order to turn the piston 10 or 110.

The method and apparatus of the present invention as described above provide numerous advantages. For example, machining may be accomplished while avoiding part distortions by being able to conform to part variations. Also, the method and apparatus can be utilized in a manual or automatic workpiece locating and clamping system to minimize external forces since the workpiece is squeezed through the solid portions of the workpiece such as the piston dome.

The invention has been described in illustrative embodiments, but it will be evident to those skilled in the art that variations may be made from the foregoing teachings without departing from the scope of the following claims.

I claim:

1. In combination with a method for locating and clamping a workpiece, such as a piston (10, 110) prior to rotating same about a rotary axis (22, 122) in a machining operation by the steps of centering the workpiece about the rotary axis, applying a first axial force on a first surface of the workpiece in a first direction at a first set of non-colinear contact points radially spaced about the rotary axis, and applying a second axial force on a second surface of the workpiece in a second direction opposite the first direction at a second set of non-colinear contact points angularly spaced apart about the rotary axis, the forces at the first and second sets of contact points coacting to at least partially clamp the workpiece therebetween, the improvement wherein:
the step of applying the first axial force is performed at four non-colinear contact points angularly spaced apart about the rotary axis; and
the further steps of equalizing (164) the axial force applied by two of the four contact points of the first set of contact points to effectively provide three non-colinear contact points; and
maintaining the axial force of the two other contact points of the first set of four contact points during said step of equalizing wherein a locating plane on the first surface of the workpiece is created by the three non-colinear contact points and wherein corresponding pairs of the first and second sets of contact points are directly opposite one another on the first and second surfaces of the workpiece.

2. The method as claimed in claim 1 further comprising the step of applying (168) a clamping axial force at the first and second sets of contact points after the step of equalizing to fully clamp the workpiece.

3. The method as claimed in claim 2 wherein the step of centering is accomplished by applying (162) a centering axial force on the first surface of the workpiece.

4. The method as claimed in claim 2 wherein the step of centering is accomplished by extending a retractable centering element (52, 152) into contact with the first surface of the workpiece along the rotary axis.

5. The method as claimed in claim 4 further including the step of retracting (166) the retractable centering element away from the first surface of the workpiece along the central rotary axis prior to the step of applying the clamping axial force.

6. In combination with an apparatus for locating and clamping a workpiece, such as a piston (10, 110), prior to rotating same about a rotary axis (22, 122) in a machining operation, the apparatus having a first set of axially extending members (46, 48; 146, 148) for applying a first axial force on a first surface of the workpiece in a first direction at non-colinear contact points angularly spaced apart about the rotary axis, and a second set of axially extending members (30, 130) for applying a second axial force on a second surface of the workpiece in a second direction opposite the first direction at non-colinear contact points, the first and second sets of members coacting to at least partially clamp the workpiece therebetween, the improvement wherein:
the first set of axially extending members includes two locating members (46, 146) and two equalizing locating members (48, 148) and the second set of axially extending members includes four equalizing driving members (30, 130) directly opposite from the locating members (46, 48; 146, 148) of the first set of axially extending members, wherein the apparatus further includes equalizing means (50, 150) for equalizing the axial force applied by the pair of equalizing members (48, 148) of said first set of members so that the two locating members (46, 146) and the two equalizing locating members (48, 148) effectively provide three non-colinear contact points wherein a locating plane on the first surface of the workpiece is created by the three non-colinear contact points.

7. The apparatus as claimed in claim 6 wherein said equalizing means includes an equalizing member (50, 150) which coacts with the pair of said first set of elements to equalize the axial force therebetween.

8. The apparatus as claimed in claim 7 wherein the equalizing member includes an inclined portion (57, 157) at opposite ends thereof in sliding engagement with corresponding end portions (59, 159) of the pair of the first set of elements.

9. The apparatus as claimed in claim 6 further including housing means (38, 40; 138, 140) and centering means for centering the workpiece about the rotary axis and wherein the centering means includes a centering element (52, 152) supported within said housing means for movement between extended and retracted positions along the rotary axis, the centering element centering the workpiece in its extended position.

10. The apparatus as claimed in claim 9 further including actuator means (54, 56; 145, 147, 154, 156) for moving said centering element relative to said housing means towards the first surface.

11. The apparatus as claimed in claim 10 wherein said actuator means includes a plunger (56, 156) slidably received within said housing means for reciprocating movement relative to said housing means in response to an axial pressure applied thereto.

12. The apparatus as claimed in claim 11 further including biasing means (44, 144) for biasing said plunger axially away from the first surface of the workpiece.

13. The apparatus as claimed in claim 12 wherein said biasing means includes a plurality of springs (44, 144) radially spaced about the rotary axis and extending between the plunger and said housing means.

14. The apparatus as claimed in claim 11 wherein said actuator means includes spring means (56, 156) for biasing the centering element away from the plunger towards the first surface.

15. The apparatus as claimed in claim 14 wherein said actuator means includes adjustment means (147) for varying the biasing force applied to the centering element by the spring means.

* * * * *